United States Patent
Wurz et al.

(10) Patent No.: US 6,322,617 B1
(45) Date of Patent: Nov. 27, 2001

(54) PURIFICATION DEVICE FOR SEPARATING GASEOUS OR PARTICULATE CONSTITUENTS FROM GAS STREAMS

(75) Inventors: Dieter Wurz, Baden-Baden; Lothar Bendig, Pfullingen; Juergen Speier, Reutlingen, all of (DE)

(73) Assignees: Lechler GmbH & Co. KG, Metzingen; Dieter Wurz, Baden-Baden, both of (DE)

( * ) Notice: Subject to any disclaimer, the term of this patent is extended or adjusted under 35 U.S.C. 154(b) by 0 days.

(21) Appl. No.: 09/284,869
(22) PCT Filed: Aug. 19, 1998
(86) PCT No.: PCT/EP98/05253
  § 371 Date: Jun. 17, 1999
  § 102(e) Date: Jun. 17, 1999
(87) PCT Pub. No.: WO99/10085
  PCT Pub. Date: Mar. 4, 1999

(30) Foreign Application Priority Data
Aug. 23, 1997 (DE) .............................. 197 36 761

(51) Int. Cl.⁷ .............................. B01D 47/08; B05B 1/34
(52) U.S. Cl. .................. 96/314; 96/319; 95/219; 261/117; 239/463

(58) Field of Search .............................. 95/219, 200, 224, 95/225, 220; 96/314, 319; 261/115–117, DIG. 9, 118; 239/463, 453

(56) References Cited

U.S. PATENT DOCUMENTS

| | | | |
|---|---|---|---|
| 2,642,950 | * | 6/1953 | Clark et al. . |
| 3,880,597 | * | 4/1975 | Goldschmidt et al. . |
| 3,989,488 | * | 11/1976 | Wisting . |
| 4,008,056 | * | 2/1977 | Potter . |
| 4,116,383 | * | 9/1978 | Johnson . |
| 4,529,421 | * | 7/1985 | Parma . |
| 4,533,522 | * | 8/1985 | Leimkuhler . |
| 4,584,147 | | 4/1986 | Stehning .............................. 261/115 |
| 4,990,167 | * | 2/1991 | Stehning . |
| 5,173,093 | * | 12/1992 | Johnson et al. . |

FOREIGN PATENT DOCUMENTS

0524729 A1  1/1993  (EP) .
WO/95/33547  12/1995  (EP) .

* cited by examiner

Primary Examiner—David A. Simmons
Assistant Examiner—Fred Prince
(74) Attorney, Agent, or Firm—Crowell & Moring LLP

(57) ABSTRACT

A scrubbing apparatus for separating gaseous or particulate contents, especially from flue gas, using a plurality of spin spray nozzles arranged such that adjacent spray nozzles have a different spin. Double spin spray nozzles can be used that produce oppositely aimed spray jets of different spin.

20 Claims, 6 Drawing Sheets

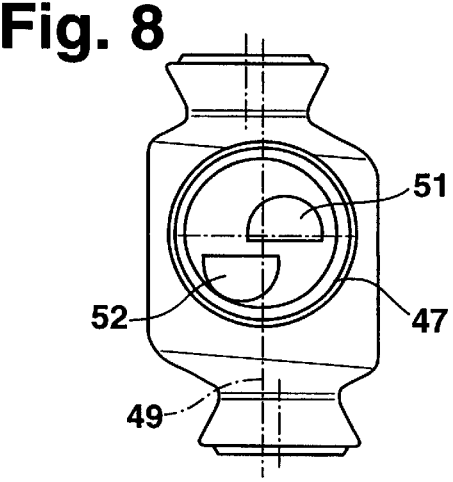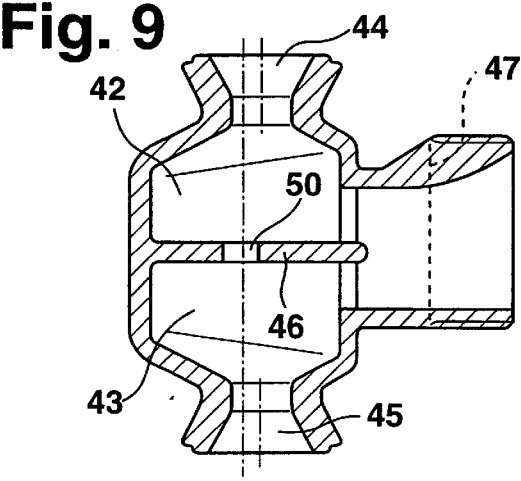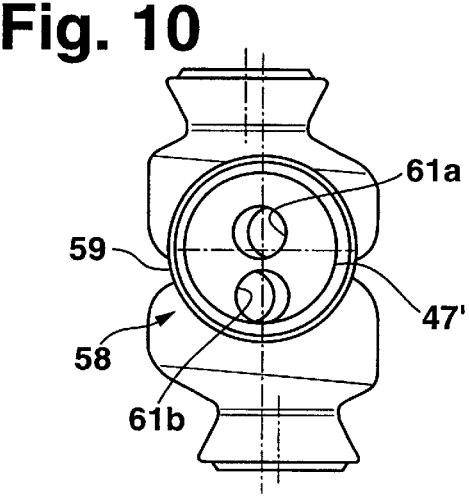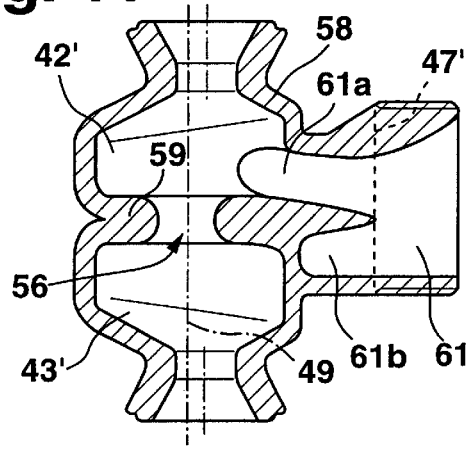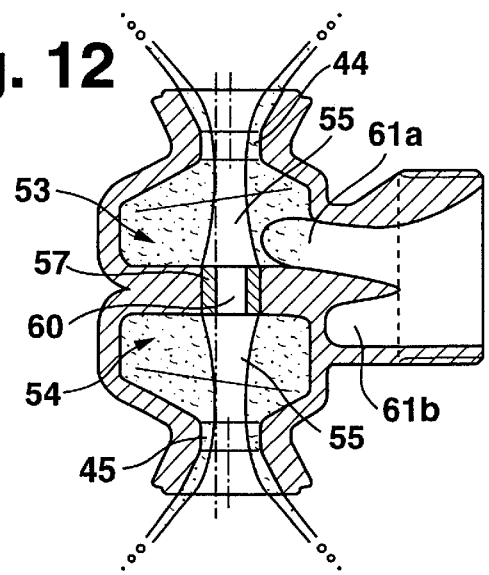

PURIFICATION DEVICE FOR SEPARATING GASEOUS OR PARTICULATE CONSTITUENTS FROM GAS STREAMS

BACKGROUND AND SUMMARY OF THE INVENTION

The invention relates to a scrubbing system for separating gaseous or particulate matter from gas streams, having a plurality of spin spray nozzles for injecting and distributing a wash liquid into the gas stream.

To separate gaseous or particulate matter from streams of air or gas, so-called "gas scrubbers" are used, in which a wash liquid is introduced from spray nozzles into the gas stream and distributed as uniformly as possible across its cross section. Such gas scrubbers, which are also called nozzle scrubbers, are used in large industrial models in flue gas cleaning apparatus in which acid flue gas components are removed, such as sulfur dioxide, chlorine or hydrogen fluoride, and to a lesser extent smoke particles, by the use of appropriate wash liquids.

The nozzles used in such gas scrubbers are made as a rule in the form of spin nozzles. The stream of liquid passing through the nozzle is subjected in the nozzle or upon leaving the nozzle to a spin, so that the liquid droplets plus the velocity components axially and radially—since the stream contains a conical spray—will also have a circumferential component. This spinning action has proven desirable for the spraying process, because it permits the achievement of a fine droplet spectrum, stability in the spray, and the fanning out of the spray to distribute the wash liquid in the gas stream. Spray nozzles of a similar kind, in which a spin is provided to produce a conical curtain, are disclosed in DE-OS 26 11 387, where a sprayer for sludge is described in which the liquid is introduced tangentially into a circular throat and exits at least across an edge in the form of a conical curtain of fine droplets.

It has been found that, in the arrangements mentioned above with a plurality of spin spray nozzles, disadvantages occur with regard to uniform sweeping through the scrubber, resulting in an impairment of performance. This is the case especially with gas scrubbers which, in the form of large flue gas scrubbers, operate on the countercurrent principle. In these the gas stream is introduced through a lateral gas injection connection into a guiding passage of the scrubber, flows through the latter from the bottom up, is sprayed in a countercurrent area with the washing fluid from a plurality of nozzles uniformly distributed on the cross section, and then exits again from a laterally or centrally disposed discharge. Between the injected wash liquid droplets and the gas flow an impulse exchange takes place which manifests itself mainly as a pressure loss which the flow undergoes in passing through the scrubber. But the spin produced in a uniform sense by the spray nozzles also brings the result that along the walls of the scrubber an impulse directed in and contrary to the direction of the entry of the gas stream is transferred to it, which again creates a large-area rotation of the field of flow of the gas stream. This in turn results in an asymmetrical flow through the gas scrubber. It has been found that the gas flow from the inlet can penetrate with little loss of pressure along the left wall of the scrubber to the left rear corner, and there it may be insufficiently cleaned and can rise with a relatively high velocity. The result is a very irregular and pronounced asymmetrical distribution of the residual contents in the gas flow behind the scrubber. Poor efficiency again results due to the irregular separation in the scrubber.

The present invention is therefore addressed to the problem of relieving the situation with simple measures.

For the solution of this problem, provision is made in a cleaning system of the kind described above so that spin spray nozzles with different spinning senses, with respect to the main direction of flow of the gas stream, to compensate for any spin in the main flow. By this configuration it is brought about that, due to the superimposition of the individual vortices of the spin spray nozzles arranged alternately with left-hand or right-hand spin, a cancellation of the spin components is produced, so that any reverse effect on the gas flow will not take place or will do so to only a greatly attenuated extent. This in turn leads to a uniform separation and thus to a higher efficiency, without the need for additional expensive measures.

In an advantageous embodiment of the invention, in a cleaning system with spin spray nozzles disposed side by side in rows, provision can be made for adjacent spin spray nozzles to have contrary spin senses in each row, so that, within a relatively small space, the desired superimposition of the individual vortices is achieved and with it a largely spin-free flow is achieved. It is advantageous in a further embodiment of the invention, in the case of a gas scrubber with a channel for guiding the gas stream, which has at a distance ahead of the spin spray nozzles an entrance for the gas stream entering into it, if the rows of spin spray nozzles run transversely of the direction of the entry of the gas stream into the guiding channel. In further embodiment of the invention, in the case of a gas scrubber with a guiding channel constructed symmetrically with a central plane running through the inlet, the spin nozzles which are on the left of the central plane have a spin contrary to the spin of the spin spray nozzles in a mirror image relationship with them on the right side of the central plane. It is, however, also possible to group nozzles of equal sense of spin to adapt them to the conditions of entry into the scrubber, so that the direction of flow can also be positively influenced thereby. Thus, in further embodiment of the invention, for example, the tangential component of the spin spray nozzles disposed adjacent to the walls of the guiding channel which run parallel to the central plane can be aimed at the side of the guiding channel which is provided with the inlet port. By such an arrangement of the nozzles an impulse component of the control field aimed against the inflow can be built up in the vicinity of the side walls of the scrubber. This works against the tendency of the gas flow to run along the shower-deprived side walls to the opposite scrubber wall and there to climb up contaminated. Instead, the still uncleaned flue gas is drawn more strongly into the intensive, neutral shower field of the scrubber.

In another embodiment of the invention, a spin spray nozzle, configured as a double spin spray nozzle with two coaxial spray jets discharging oppositely with opposite spin sense, is very especially suitable for a scrubbing system of the kind referred to in the beginning. Double-stream spin spray nozzles are known (DE 26 11 387 A1), but the two opposite sprays issue with the same spin. With such nozzles, therefore, compensating spin cannot be achieved in the flow.

Of course, it would also be possible, instead of the double spin spray nozzles with spray jets with opposite spin according to the invention, to provide two spin spray nozzles of a known kind, these nozzles being offset 180° from one another. This, however, would necessitate the use of twice the number of spray nozzles, which would greatly increase the cost. The new double spin spray nozzles with their jets spinning in opposite senses are comparatively simple to manufacture, as will be explained further on. They require only one wash liquid connection if they are designed accordingly.

In another embodiment of the invention, the new spin spray nozzle therefore has two coaxially disposed spin chambers with their orifices aimed in opposite directions, which have a common inlet orifice in the area remote from the outlet openings which leads into each chamber with a branch which is aligned tangentially to the chamber wall which is associated but lies on opposite sides of the central plane of the inlet opening. With this configuration a common feed connection can be provided, yet due to the separate feed branches, different spin directions are achieved in the two oppositely issuing spray jets. Also the pulsation produced by the spray jets on the flow in the scrubber, which leads to a counter-pressure, is compensated by the new nozzle.

In another embodiment of the invention, both spin chambers can be parts of hollow cone or solid cone spray nozzles. The result is the possibility of configuring the nozzle as a hollow cone spray nozzle if a common dividing wall forms the bottoms of the spin chambers, and this dividing wall is provided with an opening in the axis of the nozzle. Carrying this idea further, the opening can be formed by a central constriction in the area of the feed opening of the spin chamber, and for further isolation of the spin chambers a hole disk whose diameter is not greater than one of the exit openings can be placed in the opening to permit installation of the hole disk.

The double spray nozzle, however, can also be configured such that the dividing wall is provided on both sides with elevations and depressions for the production of a solid cone spray jet. It is also possible, however, to dispense with a dividing wall, and in each spin chamber, which then does not have to have a branch running tangentially to its wall, to provide a spin insert which produces the desired contrary spin in the two spin chambers. Carrying this idea further, a dividing wall can be provided between the spin inserts and can have elevations to stabilize the flow.

Lastly, it is also possible to make the coaxial spin chambers and their discharge orifices of the same size, so that with such nozzles only a partial compensation of the spin is achieved, which can be advantageous when these nozzles are used in the wall area in the manner indicated previously.

BRIEF DESCRIPTION OF THE DRAWINGS

The invention is represented by embodiments in the drawing and is described below.

DETAILED DESCRIPTION OF PREFERRED EMBODIMENTS

Figure 1:
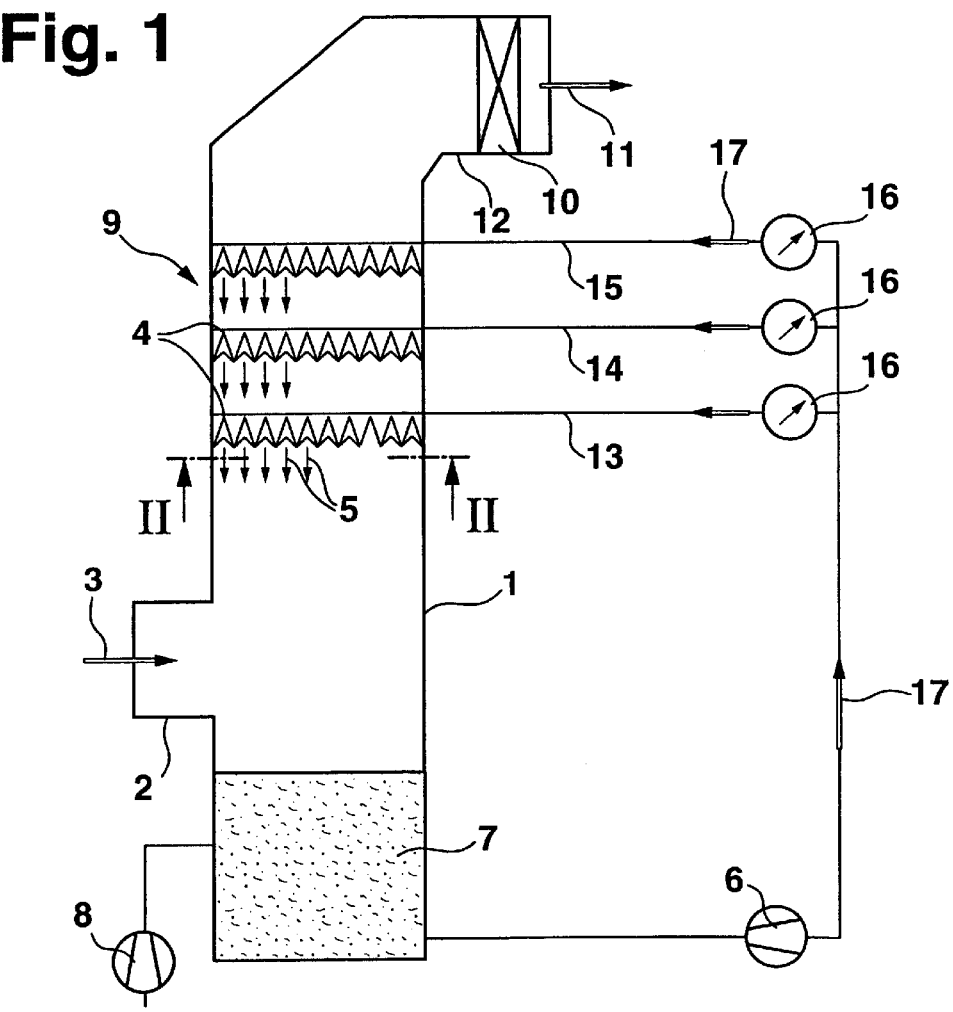
FIG. 1 is a schematic longitudinal section through a countercurrent scrubber according to the invention, FIG. 2 an enlarged representation of a section through FIG. 1 along line II—II, FIG. 3 a section similar to FIG. 2, but through a gas scrubber with a circular channel for carrying the gas, FIG. 4 a countercurrent scrubber in longitudinal section similar to FIG. 1, but in a different embodiment of the invention, FIG. 5 an enlarged view of a section taken along line V—V through the channel of the countercurrent scrubber of FIG. 4, FIG. 6 an enlarged side view of one of the double-jet nozzles as used in the embodiment of FIGS. 4 and 5, FIG. 7 a section taken along section line VII—VII of FIG. 6 of the double-jet nozzles of FIG. 6, FIG. 8 a spin spray nozzle similar to FIG. 6, but in a different embodiment, FIG. 9 a cross section of the spin spray nozzle of FIG. 8 represented as in FIG. 7, FIG. 10 another embodiment of a spin spray nozzle according to the invention, FIG. 11 a cross section through the spin spray nozzle of FIG. 10, FIG. 12 a cross section through a spin spray nozzle similar to FIGS. 10 and 11, but in a variant, FIG. 13 another variant of a spin spray nozzle according to the invention, FIG. 14 a section through the spin spray nozzle of FIG. 13 along the line XIV—XIV in a type having spin inserts in the spin chambers, FIG. 15 a variant of the spin spray nozzle of FIG. 13 with a dividing wall between the spin inserts, FIG. 16 a section through the spin spray nozzle of FIG. 15, FIG. 17 a section through the spin spray nozzle of FIG. 16 taken along line XVII—XVII, FIG. 18 another variant of a spin spray nozzle according to the invention without spin inserts, FIG. 19 a section through the spin spray nozzle of FIG. 18, and FIG. 20 a representation of the cross section taken along line XX—XX in FIG. 19.
Figure 2:
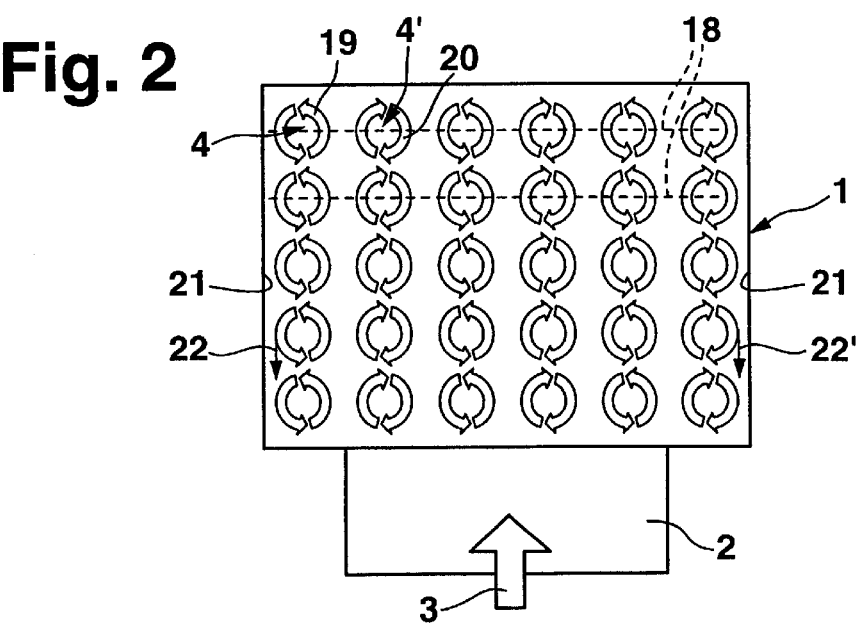

In FIGS. 1 and 2 a countercurrent scrubber is shown which can be used for flue gas scrubbing, for example. The countercurrent scrubber consists of a vertically disposed shaft-like guiding channel 1 of rectangular cross section. An inlet 2 leads laterally into this guiding channel about in the lower third of the latter, and the raw gas to be scrubbed can be introduced through it in the direction of the arrow 3, first into an inlet and distribution area. This raw gas flows upward and is sprayed countercurrently with a wash liquid in the area 9 in the upper third of the guiding channel 1. From a plurality of spin spray nozzles 4 the wash liquid is discharged uniformly over the cross section of the guiding channel in the direction of the arrows 5. This wash liquid is withdrawn through a pump 6 from a sump 7 located at the bottom end of the guiding channel 1 below the inlet 2. In this sump 7 the gaseous or particulate substances accumulate which have been separated by the wash liquid from the ascending raw gas. The sump 7 is also supplied with wash liquid by an additional pump 8. The raw gas flowing upward in the guiding channel 1 through the area of the spray nozzles 4 is then freed in a droplet separator 10 from the liquid entrained by its flowing through area 9 and passes as clean gas in the direction of arrow 11 through the outlet 12 of the guiding channel 1.

As it is furthermore seen in FIG. 1, the spin spray nozzles 4 are arranged one above the other at three levels in area 9. The spin spray nozzles 4 in each of these levels can be supplied with wash liquid separately in the direction of arrows 17 through lines 13, 14 and 15 at a certain pressure adjusted by pressure control valves 16.

Figure 3:
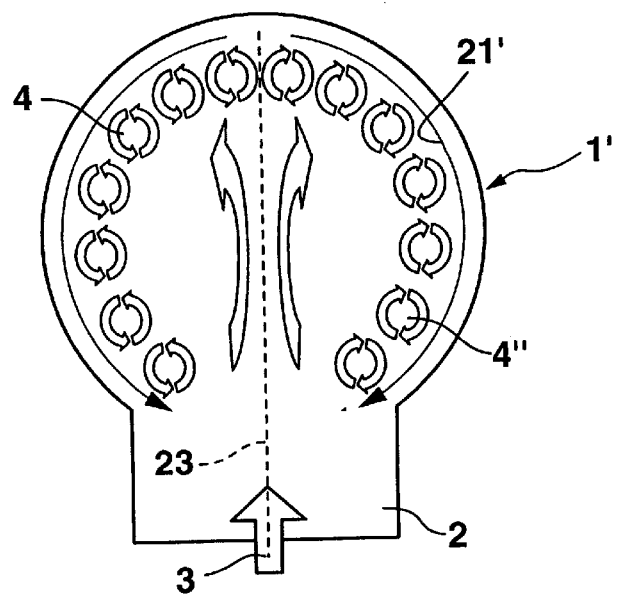

FIG. 2 shows that in each level the spin spray nozzles are arranged at equal distances apart from one another in rows 18 which run parallel to one another and at right angles to the raw gas inlet 3. FIG. 2 also shows that adjacent nozzles 4 and 4' in each row 18 have different spin directions 19 and 20, respectively. Thus the spin 19 is counterclockwise, but spin 20 runs clockwise. The overall arrangement is made such that the nozzles located in the area of the side walls 21 of the guiding channel have a spin such that their tangential components 22 and 22', respectively, related to the particular wall 21 are directed toward the inlet 2. This overall arrangement of the spin spray nozzles 4 and 4', which can be the same within the individual planes or at least offset in one plane from the adjacent plane, brings it about for one thing that the entire flow in area 9 has no pronounced overall spin which might result in an irregular flow through the guiding channel 1. While in the case of the embodiment of FIGS. 1 and 2 a rectangular guiding channel 1 is provided, FIG. 3 shows a variant in which a guiding channel 1' of circular cross section is provided. Here provision can be made such that the spin spray nozzles 4 and 4' with respect to the central plane 23 passing through the inlet 2 are divided in cross section half each so that left of the central plane 23 spin spray nozzles 4 are provided which have a spin counter-clockwise and on the right of the central plane 23 the spin spray nozzles 4' have a clockwise spin.

Here provision can be made such that the spin spray nozzles 4 are separated from spin spray nozzles 4' by a central plane 23 such that left of the central plane 23 the spin spray nozzles 4 have a counterclockwise spin and on the right the spin spray nozzles 4' have a clockwise spin. Again in this variant, at the wall 21' a tangential component directed along the wall 21' toward the inlet 2 is the result.

Figure 4:
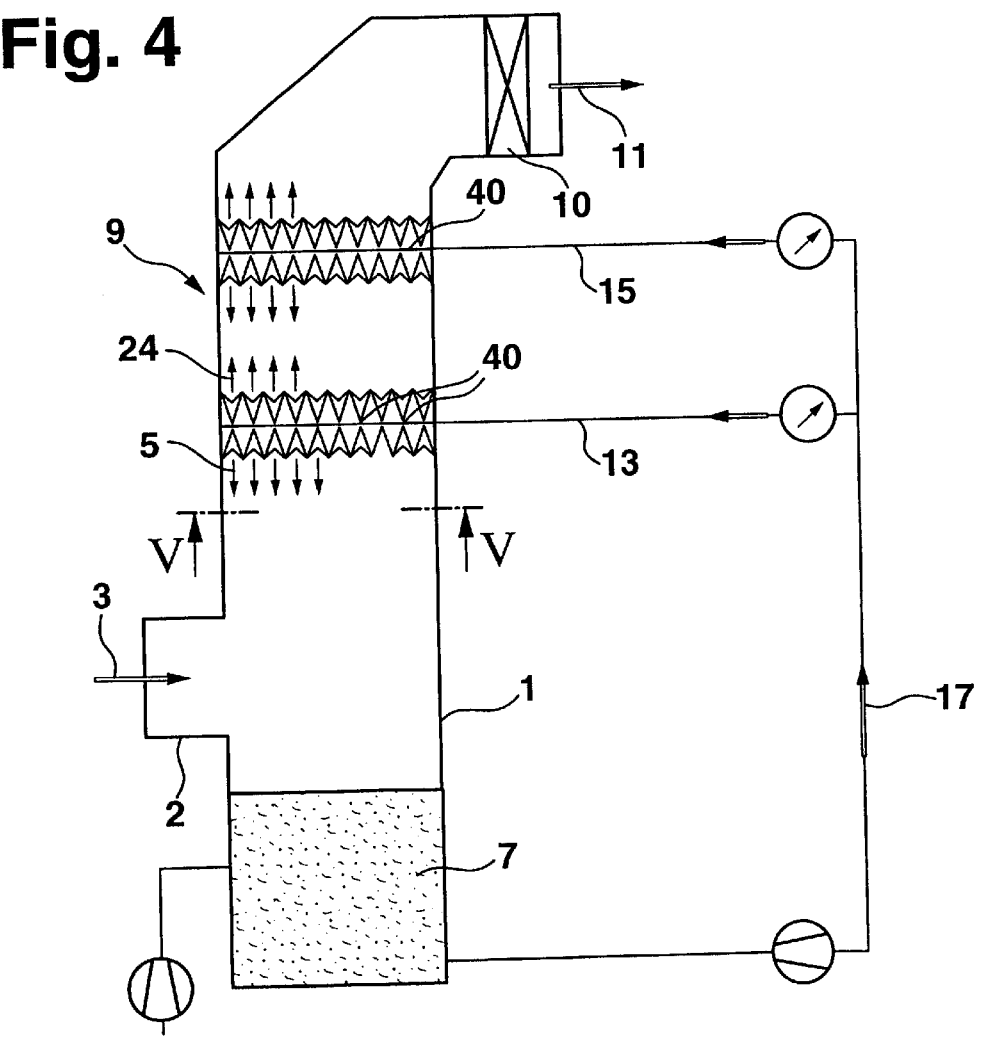
Figure 5:
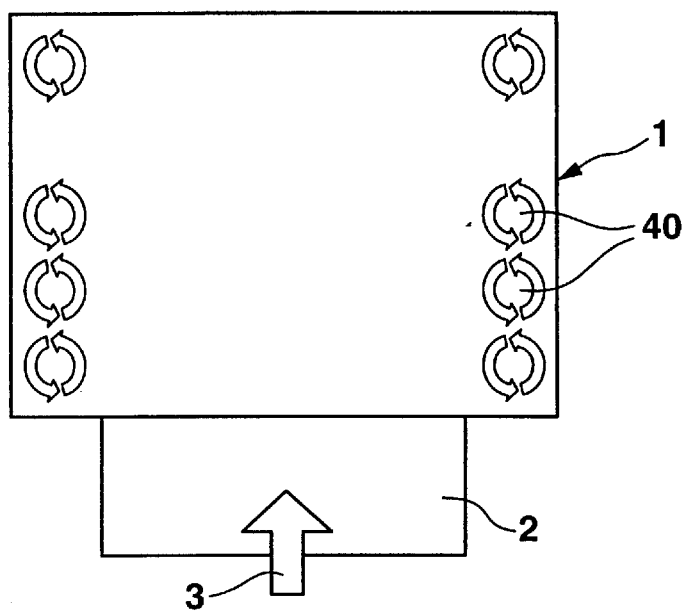

While in the case of the embodiments of FIGS. 1, 2 and 3 spin spray nozzles of conventional type were provided, which are arranged, however, in a special manner, in the embodiment of FIGS. 4 and 5 a new kind of spin spray nozzles 40 is provided, which are described in detail with the aid of FIGS. 6 to 20. These spin spray nozzles are so-called double-jet spray nozzles in which spray jets issuing coaxially but in opposite directions are used, each having an opposite spin. Thus, in FIG. 4, for example, an array of double-jet spray nozzles is provided in the lower plane of area 9 and spray the wash fluid in the direction of arrow 5 countercurrently to the flow of the gas fed through the inlet 2, but simultaneously in the direction of gas flow indicated by arrows 24 contrary to the spray jet direction 5 of the first streams. The same applies to the second plane of spray nozzles 40. The spin of the spray jets issuing in the direction of arrows 5 and 24, respectively, is opposite, so that for example the spin of the spray jets issuing in the direction of arrows 5 from the double-jet nozzles 40 is counterclockwise, but the spin of the spray jets issuing from the same double-jet nozzles 40 is clockwise. The result of this configuration is then that an arrangement of nozzles side by side in the individual rows need not be made with their spin in opposite directions. Instead, as already indicated, all downwardly directed spray jets aimed countercurrently to the flowing gas can be provided with clockwise or counterclockwise spin and the oppositely aimed jets can be provided with the opposite spin. The spin impulse exercised by the spray jets on the total flow of the gas is thereby compensated, so that the desired spin compensation can be achieved by such use of new double-jet spray nozzles.

FIG. 5 shows that, as seen in the direction of the section line V—V, all spray nozzles 40 produce a counterclockwise spin, while the oppositely aimed spray jets (not shown) produce a clockwise spin.

Figure 6:
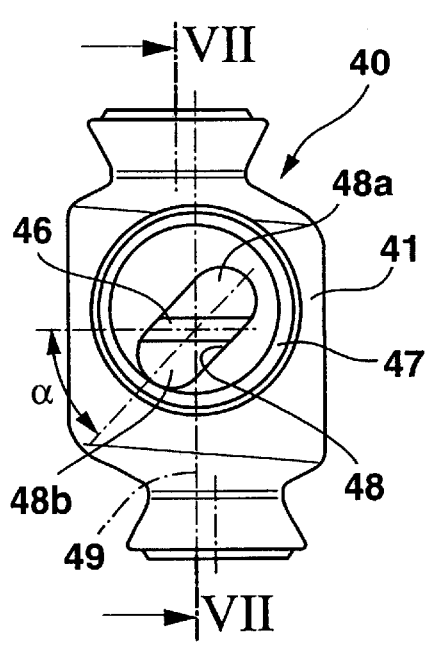
Figure 7:
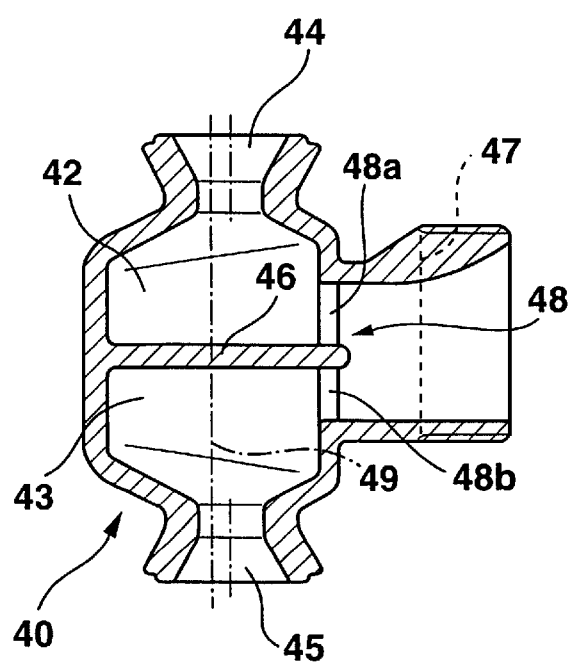

FIGS. 6 and 7 show a first embodiment of such a novel double-jet spray nozzle according to the invention, such as can be used, in place of the special arrangement of conventional spin spray nozzles of FIGS. 1 and 2, in an arrangement according to FIG. 4. The new double-jet spray nozzles, however, can be used not only for the gas scrubbers shown. They can be used anywhere where it is useful to act upon a flow with spray jets without any rotary impulses, or to use them when a compensating spin appears desirable, or when it appears to be advisable or desirable to replace two spin spray nozzles of conventional type with a double-spin spray nozzle according to the invention.

FIGS. 6 and 7 show that the new double-spin spray nozzle consists of a nozzle casing 41 in which two chambers 42 and 43 are formed which serve as spin chambers, and are each provided with a discharge orifice 44 and 45, respectively. The two chambers 42 and 43 are shut off from one another by a dividing wall 46 which reaches all the way into an inlet port 47 through which the medium to be sprayed—therefore the wash liquid in this embodiment—enters and then is distributed to the two chambers 42 and 43. As FIG. 6 shows, the orifice 48 of the inlet port 47 into the chambers 42 and 43 is in the form of a slot inclined at an angle α of 45° to the nozzle axis 49, which is planned so that its portion 48a lying above the dividing wall 46 and its portion 48b lying below same are of equal size. Now the liquid to be sprayed can enter through portion 48a of the orifice 48 into the upper chamber 42 and through the lower portion 48b into the lower chamber 43. The configuration of the inlet port 47 and the arrangement of the orifice 48 is chosen such that the portion of the liquid coming into the chamber 42 through the port 47 is deflected approximately tangentially to the wall of chamber 42 that is on the right in FIG. 6, and the portion of the liquid entering through the lower portion is deflected approximately tangentially to the wall on the left of chamber 43 in FIG. 6. Thus a counterclockwise spinning flow develops in chamber 42, but a clockwise flow in chamber 43. At the outlet orifices 44 and 45 of the double-jet spin nozzle thus created, spray jets of opposite spin are discharged. Since the amount ejected and the magnitude of the spin can be kept equal, the spin of the individual nozzles 40 in the direction of axis 49 in the countercurrent scrubber of FIG. 4 is compensated, so that the gas flow in area 9 does not have imposed on it any spin in either direction.

As FIGS. 6 and 7 show, the two chambers 42 and 43 are arranged coaxially with one another. Their orifices 44 and 45 are, however, off-center from the central axis 49 of chambers 42 and 43, in a manner known in itself.

FIGS. 8 to 20 show possible variations of the double-jet spin nozzles which are shown in FIGS. 6 and 7. FIGS. 13 to 20 are not equipped with equal-size spin chambers, so that with these nozzles only partial compensation of the spin can be achieved, but this can be an advantage, especially near the wall of the guiding channel 1, as mentioned previously.

FIGS. 8 and 9 show a variant of the nozzle of FIGS. 6 and 7, inasmuch as here the dividing wall 46 is provided with a circular opening 50 between the chambers 42 and 43, through the center of which passes the central axis 49 of the chambers 42 and 43. The openings 51 and 52, like the areas 48a and 48b of FIG. 6, are offset from one another and from the central axis 49 such that the gas flow entering through the port 47 is again divided equally between the chambers 42 and 43, where they receive an opposite spin. The opening 50 serves in this case so that the upper nozzle chamber 42 can drain through the lower chamber 43 when the nozzle is not in operation, so that any solids that might possibly collect in the nozzle can be flushed out.

As explained previously, the liquid rotating in a spin nozzle forms a liquid vortex (see also FIG. 12) 53 and 54 which upon leaving the orifices 44 and 45, respectively, results in a liquid film in the form of a hollow cone which disperses in drops. Inside of the liquid vortex there is a core 55 of air in each of the two vortices 53 and 54. The hole 50, like hole 60 in FIG. 12, is therefore made of such a size that the liquid vortices 53 and 54 do not contact one another but only the air cores 55 have any connection. This also applies to the opening 56 in FIG. 11. To assure this, as shown also in FIG. 12, a hole disk 57 whose bore is sized accordingly, can be placed in the wall between the vortices 53 and 54. Here, of course, it must be assured that the hole disk 57 does not have a larger diameter than at least one of the two outlet openings 44 or 45, so as to permit installation.

FIGS. 10 and 11 show an embodiment of a double-jet nozzle which operates on the same principle as the nozzles of FIGS. 6 to 9. Here the nozzle body 58 is provided in its center with a constriction 59 which forms in the center the opening 56, which in turn can form the connection for the air cores forming in chambers 42' and 43'. The inlet port 47' is in this case divided by a short inlet section into two parts 61a and 61b which, however, are aimed in the same manner as the ones directed tangentially against the associated chamber walls in order to produce the spin. FIG. 12 shows an embodiment according to FIGS. 10 and 11, but with the additionally inserted hole disk 57 and with the schematically indicated liquid vortices 53 and 54 and the generated hollow conical jets.

Figure 13:
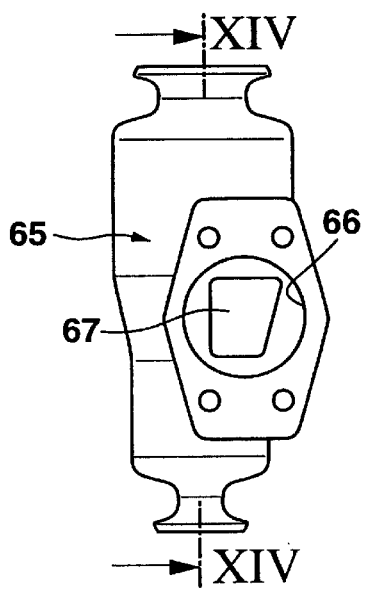
Figure 14:
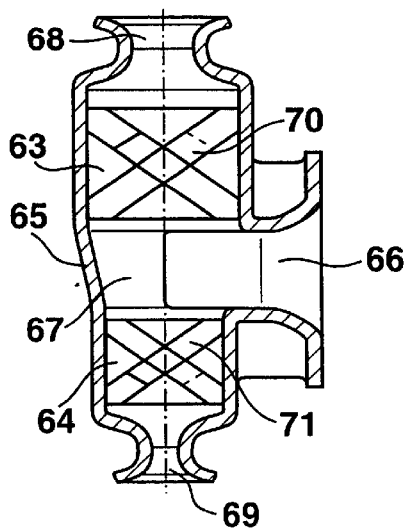

FIGS. 13 and 14 show, like FIGS. 15 to 20, a nozzle body 65 in which chambers 64 and 63 of unequal size are formed. The inlet port 66 leads, in this case without angled branches as in the embodiments in FIGS. 6 to 12, into an intermediate area 67 between the chambers 63 and 64, out of which the jets issuing from the orifices 68 and 69 toward both sides are formed by spin inserts 70 and 71 which are associated with chambers 63 and 64, respectively. The spin inserts 70 and 71 are so configured that they produce opposite spins. Since chamber 64 and the outlet orifice 69 is smaller, only a partial compensation of the spin can be achieved with the spin nozzles of FIGS. 13 and 14 and with those of FIGS. 15 to 20.

Figure 15:
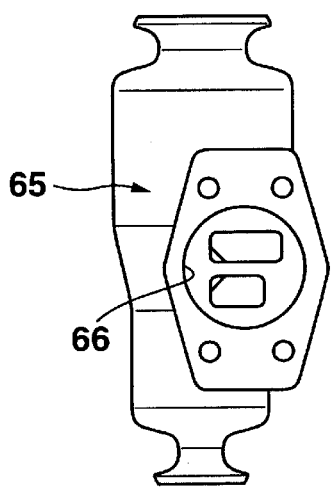
Figure 16:
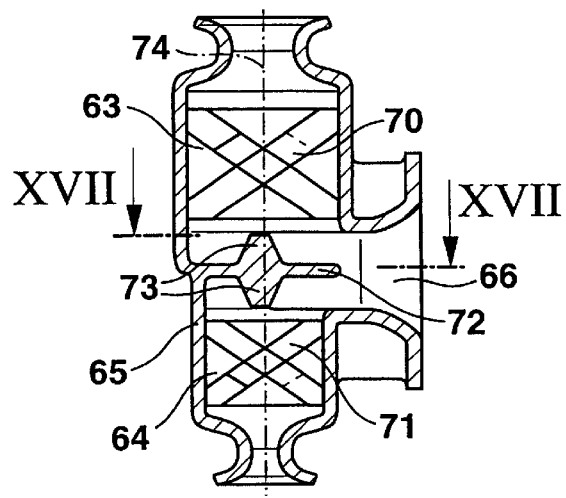
Figure 17:
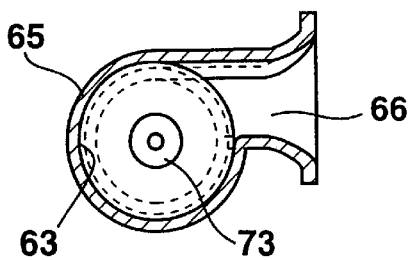

FIGS. 15 to 17 show a variant of the nozzle of FIGS. 13 and 14 insofar as here the intermediate portion 67, which in FIG. 14 is still without inserts, is divided by a wall 72 which is provided with conical elevations 73 in the direction of the axis 74 of chambers 63 and 64. These elevations 73 serve for the stabilization of the liquid vortices in chambers 63 and 64.

Figure 18:
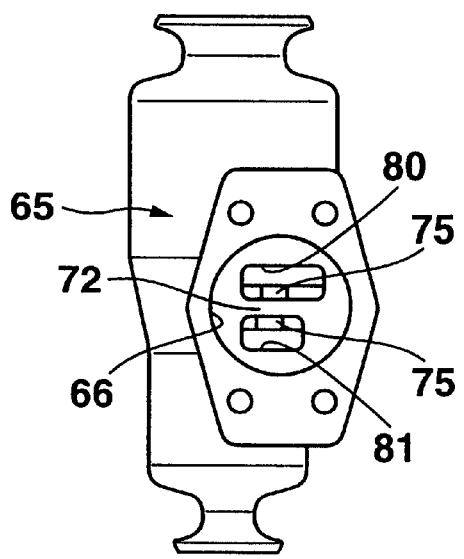
Figure 19:
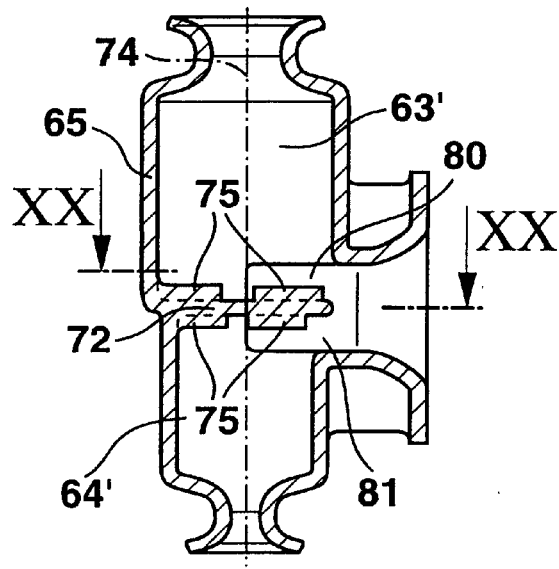
Figure 20:
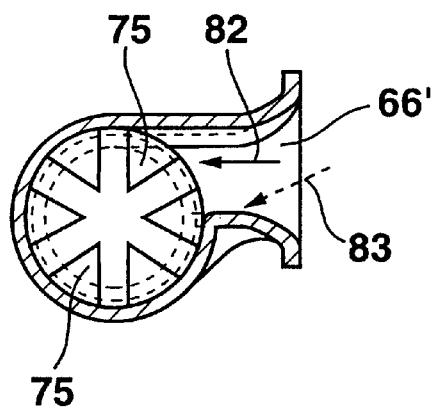

Such stabilization, however, can also be achieved, according to FIGS. 18 to 20, by elevations 75 which are disposed on the wall 72 and are directed toward both sides to the chambers 63' and 64'. Spinner inserts can in this case be dispensed with if the feeding of liquid in the inlet 66' is performed by the arrangement of appropriate inlet ports and guides 80 and 81 in a manner similar to the embodiments in FIGS. 6 to 12, tangentially toward oppositely situated walls, as indicated by the arrows 82 and 83.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A scrubbing system for the separation of gaseous or particulate matter from a gas stream, comprising:
    a guiding channel for the gas stream; and
    a plurality of spin spray nozzles located in the guiding channel for injecting and distributing wash liquid into the gas stream,
    wherein the plurality of spin spray nozzles include respective sets of spin spray nozzle outlets having different spin directions with respect to a main direction of flow of the gas stream to compensate for spin in the main flow induced by the spray nozzles.

2. The scrubbing system according to claim 1, wherein the spin spray nozzles are disposed side by side in rows and adjacent spin spray nozzles in each row have contrary spin directions.

3. The scrubbing system according to claim 1, further comprising:
    an inlet connection leading transversely into the guiding channel for the gas stream and is at a distance ahead of the spin nozzles.

4. The scrubbing system according to claim 3, wherein the spin spray nozzles are disposed side by side in rows and adjacent spin spray nozzles in each row have contrary spin directions.

5. The scrubbing system according to claim 4, wherein the rows of spin spray nozzles run transversely of the inlet direction of the gas stream in the guiding channel.

6. A double spin spray nozzle for the scrubbing system according to claim 1, comprising two spray jets issuing oppositely with opposed spin.

7. The spin spray nozzle according to claim 6, further comprising two coaxially disposed spin chambers, each spin chamber having a discharge opening, wherein the discharge opening of each spin chamber opens in an opposite direction to one another.

8. scrubbing system for the separation of gaseous or particulate matter from gas streams, comprising:
    a guiding channel for the gas stream; and
    a plurality of spin spray nozzles located in the guiding channel for injecting and distributing wash liquid into the gas stream,
    wherein the spray nozzles have different spin directions with respect to the main direction of flow of the gas stream to compensate for a spin in the main direction of flow, and further comprising:
        an inlet connection leading transversely into the guiding channel for the gas stream and is at a distance ahead of the spin nozzles,
    wherein the spin spray nozzles are disposed side by side in rows and adjacent spin spray nozzles in each row have contrary spin directions,
    wherein the spin spray nozzles are disposed side by side in rows and adjacent spin spray nozzles in each row have contrary spin directions,
    wherein the rows of spin spray nozzles run transversely of the inlet direction of the gas stream in the guiding channel, and
    wherein the guiding channel is constructed symmetrical with a central plane passing through the inlet connection.

9. The scrubbing system according to claim 8, wherein the spin spray nozzles lying on the left of the central plane have a spin contrary to the spin of the spin spray nozzles lying on the right of the central plane.

10. The scrubbing system according to claim 9, wherein tangential components of the spin spray nozzles disposed adjacent to walls running parallel to the central plane are aimed at a side of the guiding channel which is provided with the inlet connection.

11. A scrubbing system for the separation of gaseous or particulate matter from gas streams, comprising:
    a guiding channel for the gas stream; and
    a plurality of spin spray nozzles located in the guiding channel for injecting and distributing wash liquid into the gas stream,
    wherein the spray nozzles have different spin directions with respect to the main direction of flow of the gas stream to compensate for a spin in the main direction of flow, comprising two spray jets issuing oppositely with opposed spin, further comprising two coaxially disposed spin chambers, each spin chamber having a discharge opening, wherein the discharge opening of each spin chamber opens in an opposite direction to one another, wherein the spin chambers have a common inlet port leading into an area remote from the discharge orifices, which leads with one branch into each chamber and each branch is directed from the central plane of the inlet port toward a chamber wall lying on opposite sides.

12. The spin spray nozzle according to claim 11, wherein a spin insert is provided in each spin chamber which imposes on the entering liquid a spin which is the opposite of the spin produced by the other spin insert.

13. The spin spray nozzle according to claim 12, wherein a dividing bottom having elevations is provided between the spin inserts for the stabilization of the flow.

14. The spin spray nozzle according to claim 11, wherein both spin chambers are portions of hollow conical or solid conical spray nozzles.

15. The spin spray nozzle according to claim 14, wherein bottoms of the spin chambers are formed by a common dividing wall.

16. The spin spray nozzle according to claim 15, wherein the dividing wall is provided on both sides with elevations and depressions for producing liquid vortices.

17. The spin spray nozzle according to claim 15, wherein the nozzle is configured as a hollow cone spray nozzle and the dividing wall is provided in the nozzle axis or in the axis of the discharge orifices with an opening.

18. The spin spray nozzle according to claim 17, wherein the opening is formed by a central constriction in the area of the inlet port of the spin chambers.

19. The spin spray nozzles according to claim 17, wherein a hole disk is placed in the opening, whose diameter is not greater than one of the discharge ports for the further isolation of the spin chambers.

20. A scrubbing system for the separation of gaseous or particulate matter front gas streams, comprising:

a guiding channel for the gas stream; and a plurality of spin spray nozzles located in the guiding channel for injecting and distributing wash liquid into the gas stream, wherein the spin spray nozzles are disposed side by side in rows and adjacent spin spray nozzles in each row have contrary spin directions with respect to a main direction of flow in the guiding channel to compensate for spin in the main flow induced by the spray nozzles.

* * * * *